United States Patent

Broussard et al.

[11] Patent Number: 6,031,789
[45] Date of Patent: Feb. 29, 2000

[54] MAGNETIC DRIVE SUBASSEMBLY IN A DEPTH CONTROL DEVICE

[75] Inventors: Keith Broussard; Alan Sprain, both of Houston, Tex.; Louis W. Erath, Abbeville, La.

[73] Assignee: Input/Output, Inc., Stafford, Tex.

[21] Appl. No.: 08/922,712

[22] Filed: Sep. 3, 1997

[51] Int. Cl.$^7$ .................................................. H02K 7/10
[52] U.S. Cl. .................................. 367/16; 367/17; 310/75
[58] Field of Search ................................ 367/17, 18, 16, 367/19, 20; 340/7; 114/235; 310/77, 75 D, 75

[56] References Cited

U.S. PATENT DOCUMENTS

| | | | |
|---|---|---|---|
| 3,673,556 | 6/1972 | Biggs | 340/7 PG |
| 3,680,520 | 8/1972 | Smith | 114/235 B |
| 3,931,608 | 1/1976 | Cole | 340/7 PG |
| 3,943,483 | 3/1976 | Strange | 340/7 PC |
| 4,290,124 | 9/1981 | Cole | 367/18 |
| 4,709,355 | 11/1987 | Woods et al. | 367/16 |
| 4,711,194 | 12/1987 | Fowler | 367/19 |
| 5,444,318 | 8/1995 | Stumpf | 310/77 |
| 5,619,474 | 4/1997 | Kuche | 367/17 |
| 5,633,555 | 5/1997 | Ackermann et al. | 310/75 D |

Primary Examiner—Christine K. Oda
Assistant Examiner—Anthony Jolly

[57] ABSTRACT

A magnetic drive device couples the drive motor of a depth control device or bird, with the axle of the depth control wings. The magnetic drive includes a plurality of permanent magnet pieces mounted in respective drive blocks on either side of a magnetically permeable membrane of the main body of the drive mechanism. The magnet pieces are mounted side by side in alternating polarity to capture as much of the magnetic flux of the magnets as possible to minimize stray flux from escaping the drive. Pole pieces either side of the drive blocks also serve to capture stray flux. To the maximum extent possible within the constraints of mechanical durability, the drive mechanism is made of non-magnetic or non-ferrous materials which would interfere with the heading sensor of the bird. Thus, this invention avoids reducing the accuracy of the heading sensor of the bird, while eliminating a major source of seawater inleakage into the bird.

15 Claims, 3 Drawing Sheets

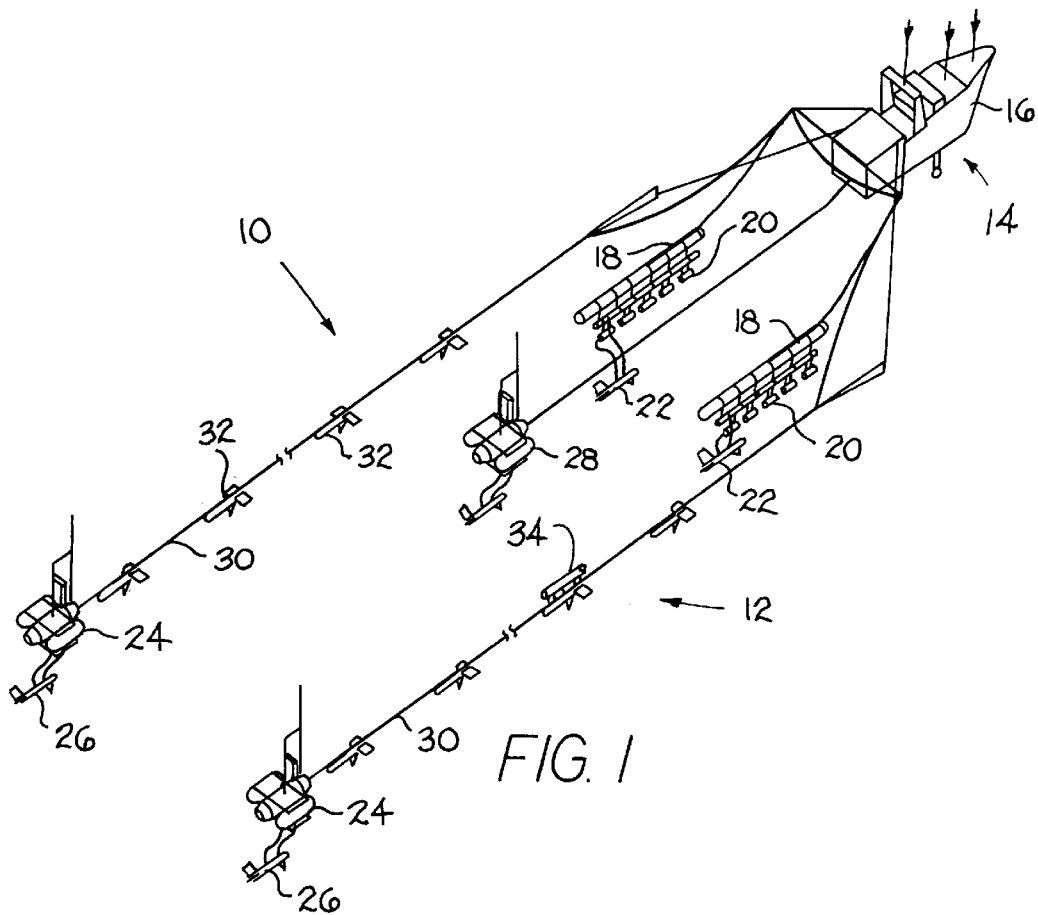
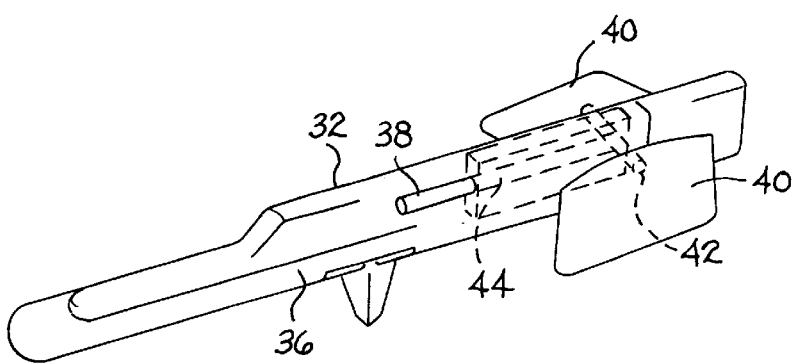

MAGNETIC DRIVE SUBASSEMBLY IN A DEPTH CONTROL DEVICE

FIELD OF THE INVENTION

The present invention relates generally to the field of depth control of marine seismic cables and, more particularly, to a sealed drive mechanism for a depth control apparatus.

BACKGROUND OF THE INVENTION

In marine seismic exploration, a vessel tows acoustic sources, such as airguns, and one or more hydrophones arrayed in a streamer. It is important that both sources and hydrophones are positioned at an exactly predetermined depth beneath the sea surface. This is often a difficult task with the hydrophone streamer.

During towing, the streamer should not deviate significantly from the predetermined depth. To maintain the streamer within tolerances of the predetermined depth, a depth control device, commonly referred to as a "bird", is placed at intervals along each streamer in the array. The bird usually includes one or more control surfaces, such as wings, to move the bird up and down in the water. In order to adjust the pitch of the wings and thereby control depth, a control signal may be transmitted from a control system to order the bird up or down. The control signal causes a drive motor to turn in one direction or the other and, through a system of linkages, the drive motor drives an axle on which the wings are mounted.

Unfortunately, the drive mechanism between the drive motor and the wings commonly presents a penetration of the skin of the bird through which seawater can leak. Such a penetration usually embodies a dynamic seal which eventually wears and starts to leak. Any such leakage of seawater into the interior of the bird can cause catastrophic failure of the depth control provided by the bird and halt seismic operations. Thus, there remains a need for a water tight means of coupling the drive motor to the wings that eliminates this source of seawater inleakage into the bird.

Further, the bird usually includes a heading sensor to determine the precise heading of the bird, and by extrapolation, the seismic streamer. Such heading sensor includes sensitive instruments affected by the earth's magnetic field to ascertain the three axis heading of the bird. Any stray magnetic signature of the bird can interfere with this heading determination. Thus, there remains a need for a drive mechanism for coupling the drive motor to the wings of the bird which minimizes the interference with the bird's heading sensor.

SUMMARY OF THE INVENTION

The present invention solves these and other problems of the prior art by coupling the drive motor of the bird with the axle of the wings with a magnetic drive. The magnetic drive includes a plurality of permanent magnet pieces mounted in respective drive blocks on either side of a magnetically permeable membrane of the main body of the drive mechanism. The magnet pieces are mounted side by side in alternating polarity to capture as much of the magnetic flux of the magnets as possible to minimize stray flux from escaping the drive. Pole pieces either side of the drive blocks also serve to capture stray flux.

Finally, to the maximum extent possible within the constraints of mechanical durability, the drive mechanism is made of non-magnetic or non-ferrous materials which would interfere with the heading sensor of the bird. Thus, this invention avoids reducing the accuracy of the heading sensor of the bird, while eliminating a major source of seawater inleakage into the bird.

These and other features of the present invention will be apparent to those of skill in the art from a review of the following detailed description along with the accompanying drawings.

BRIEF DESCRIPTION OF THE DRAWINGS

FIG. 1 depicts a sea-going watercraft towing a marine seismic system.

FIG. 2 depicts a depth control device in which the present invention finds application, showing the approximate positioning of the drive mechanism within the bird.

DETAILED DESCRIPTION OF A PREFERRED EMBODIMENT

Figure 3:
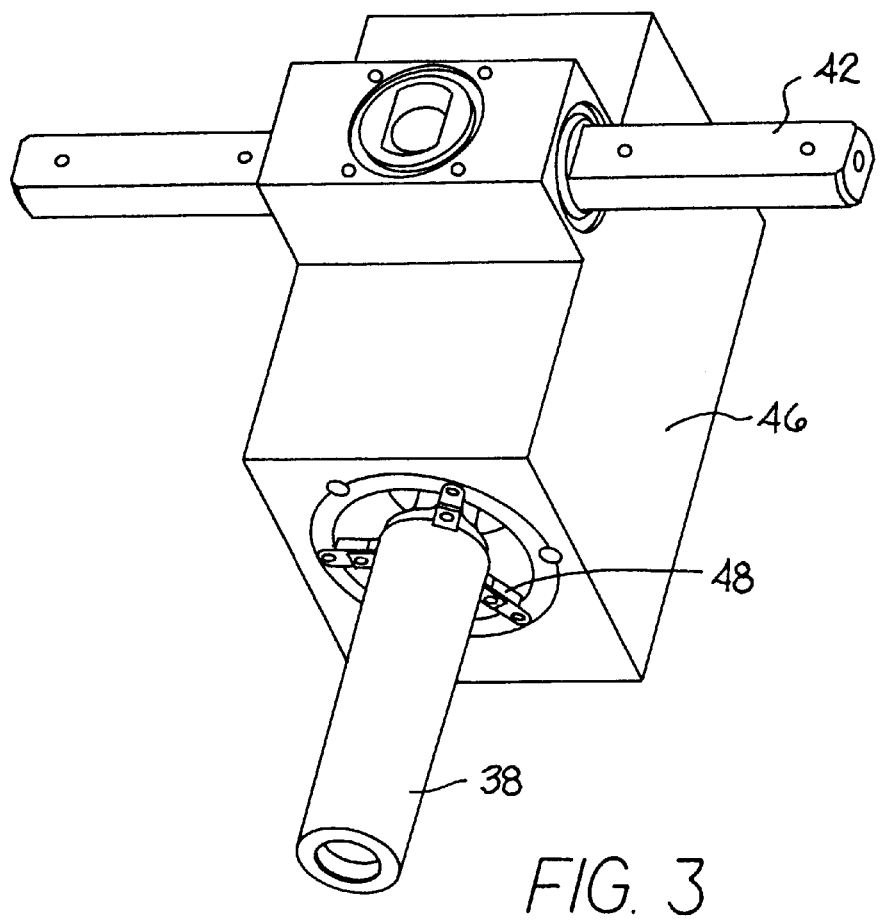
FIG. 3 is an external perspective view of the drive mechanism showing the relationship of the drive motor to the wing axle.

The system depicted in FIG. 1 is a data acquisition and control system 10 designed for marine seismic operations. The system's modular design provides the user with an integrated control and position system that can be customized to meet the particular needs of each survey. The system comprises a shipboard controller 14 and in-water remote units 12 times by vessel 16.

The in-water remote units 12 include air gun arrays 18, which may be of many well known types. Accompanying each gun array 18 is a set of gun acoustic units 20 and associated tow fish acoustic units 22 deployed below. The system also includes a tail buoy 24 and an associated tow fish acoustic unit 26 at the end of each streamer 30, for example.

The system may also include a tow buoy 28 and either a gun acoustics unit or a surface mount unit. The gun acoustics unit provides precise location of the seismic energy source relative to a fixed reference point, while the surface mount acoustic unit is used in locations where the use of streamer-mounted remote units would be impractical.

Spaced along each streamer is a plurality of depth control devices 32, wherein the present invention may find application. A depth control device 32 may also include a float tube 34 attached to it.

FIG. 2 depicts a more detailed view of a depth control device 32. The depth control device, or "bird" includes a sealed, elongate body 36 of a substantially non-magnetic material and is commonly attached to the streamer cable using special quick connect collars (not shown). Within the sealed body are the electronics for depth control and sensors for depth and temperature data, as well as acoustic range measurement and magnetic heading and field intensity. Also within the sealed body is a drive motor 38 which is coupled to control planes, which are commonly configured as a pair of wings 40. The wings 40 rotate about an axle 42 and the axle is in turn driven by a drive shaft 44. The coupling between the drive motor 38 and the wings 40 is the subject of this invention, and is shown in greater detail in FIGS. 3, 4, and 5.

As shown in FIG. 3, the motor 38 is preferably mounted to a housing 46, which may also comprise a structural component of the body 36 of the depth control device. The motor 38 preferably mounts to the housing 46 through a motor mount 48, and the motor mount may also be a structural element of the body. The motor is coupled within the structure of FIG. 3 by a magnetic drive to the axle 42 of the wings, via mechanical linkage as shown in greater detail in FIGS. 4 and 5.

Figure 4:
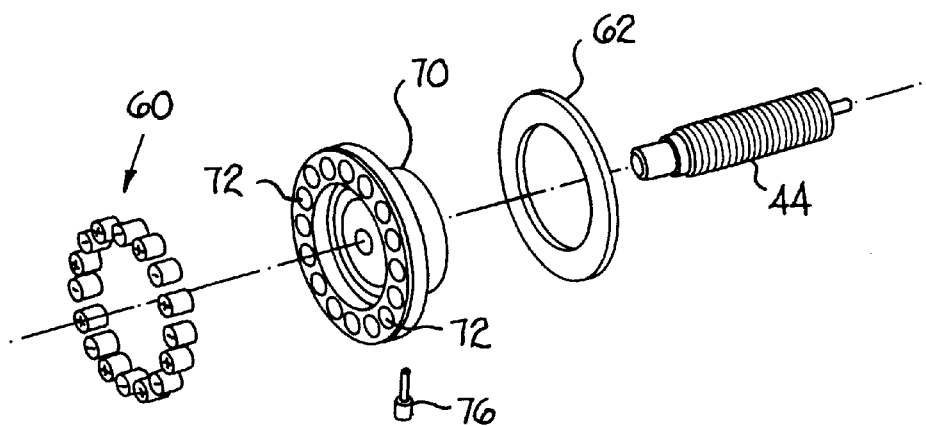
FIG. 4 is an exploded view of the magnet pieces, the wing-side drive block, the wing-side pole piece, and the wing-drive shaft of the drive mechanism.
Figure 5:
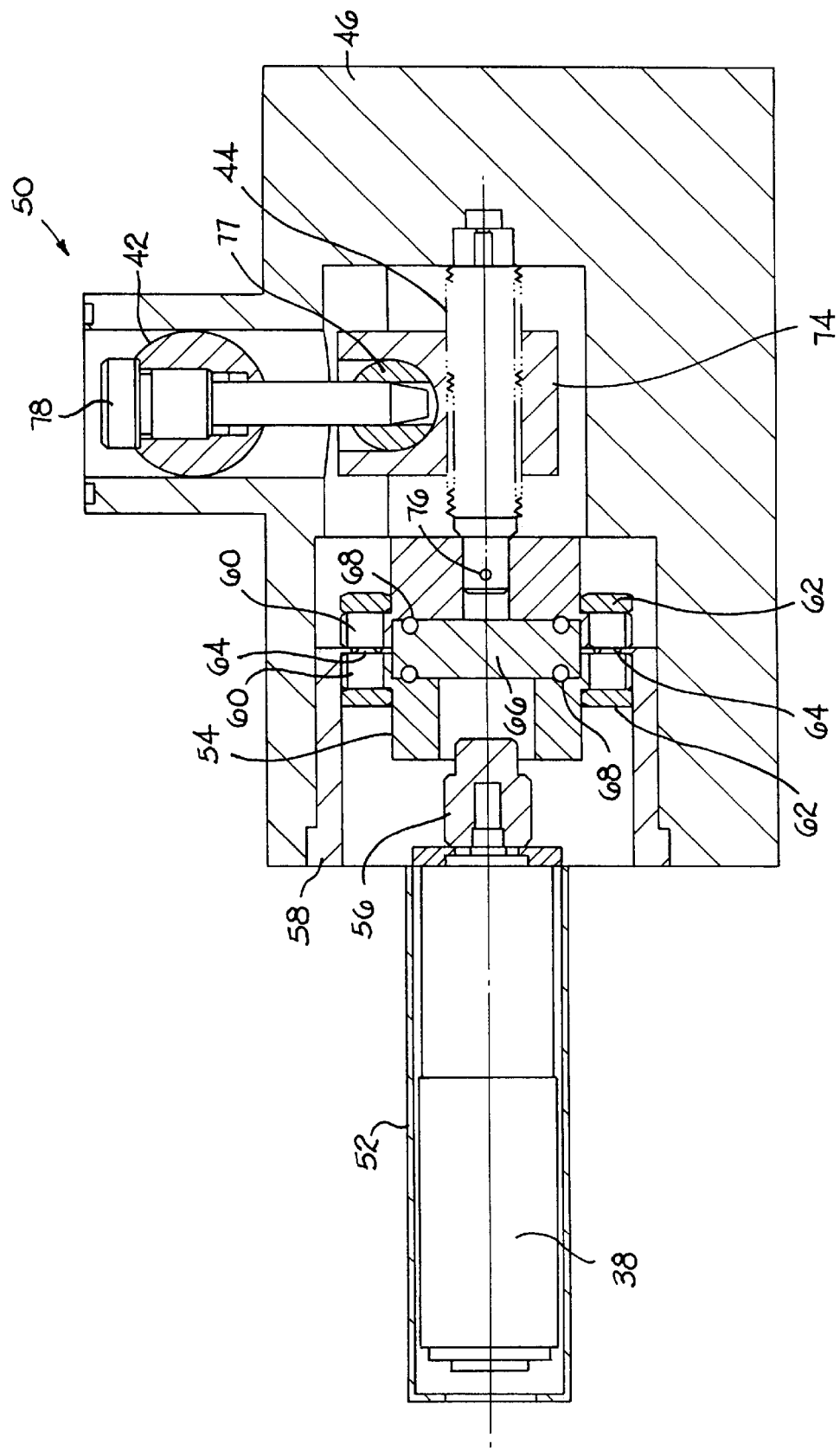
FIG. 5 is a side sectional view of the drive mechanism of the present invention.

FIG. 5 provides a side sectional view of a magnetic drive 50, and FIG. 4 provides an exploded view of certain details of the drive. The motor 38 may be enclosed in a motor shield 52, which serves both to enclose the motor against seawater and seawater-laden air and to reduce the magnetic signature of the motor outside the shield 52.

The motor 38 attaches to a motor-side drive block 54 via a motor adapter 56. The drive block 54 fits loosely inside a main body 58 to permit easy rotation of the rotating parts. The drive block retains a plurality of magnet pieces 60, which are placed in holes formed in the drive block. The magnet pieces are in turn held in place by a substantially ring-shaped pole piece 62. The pole piece also serves to capture stray magnetic flux from the magnet pieces to retain flux within the main body 58 and to enhance the torque of the magnetic drive.

The magnet pieces 60 ride adjacent a thin, annular-shaped membrane portion 64 of the main body 58. Integral with the membrane portion 64 is a center bearing portion 66, which acts as a race for a thrust bearing 68, on either side of the bearing portion 66.

On the wing side of the membrane 64, the membrane serves as a race for a bearing 68, which supports a win-side drive block 70. The wing-side components may also be referred to as "drive-side" components, since the present invention may be more broadly applicable to other apparatus than depth control devices having wings. The wing-side drive block holds magnet pieces 60, which are positioned adjacent the membrane 64. As shown in FIG. 4, the magnet pieces 60 fit into corresponding holes 72 in the drive block 70 and are retained in the drive block with a pole piece 62. The magnet pieces are arranged with alternating polarity (N-S-N-etc.) to minimize flux leakage outside the drive block.

Referring again to FIG. 5, the wing-side drive block 70 joins to a drive shaft 44 (see also FIG. 2) which may be secured with a pin 76, or other suitable means. The drive shalt 44 drives a drive nut 74 as the motor and respective drive blocks rotate, thereby imparting axial movement to the drive nut 74. Axial movement of the drive nut creates axial and rotational movement of a moment arm pivot 77, which turns a moment arm 78. The moment arm 78 is, in turn, integrally coupled to the axle 42 and creation of the moment arm therefore moves the wings 40 up or down.

Finally, while the proximal end of the drive shaft 44 is coupled to the wing-side drive block, the distal end 80 forms at hearing which is mounted in the housing 46.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A magnetic drive comprising:
   a. a motor;
   b. a motor-side drive block Coupled to the motor:
   c. a plurality of magnet pieces in the motor-side drive block;
   d. a drive-side drive block:
   e. a plurality of magnet pieces in the drive-side drive block; and
   f. a thin membrane between the motor-side drive block and the drive-side drive block.

2. The magnetic drive of claim 1, wherein the magnet pieces in the motor-side drive block and the magnet pieces in the drive-side drive block are arranged with alternating polarity.

3. The magnetic drive of claim 1, further comprising a shield around the motor and both drive blocks.

4. The magnetic drive of claim 1, further comprising a motor-side pole piece adjacent the plurality of magnet pieces in the motor-side drive block.

5. The magnetic drive of claim 1, further comprising a drive-side pole piece adjacent the plurality of magnet pieces in the drive-side drive block.

6. The magnetic drive of claim 1, further comprising drive shaft coupled to the drive-side drive block.

7. The magnetic drive of claim 6, wherein the drive shaft defines a threaded member.

8. The magnetic drive of claim 7, further comprising a drive nut around and in threaded engagement with the drive shaft.

9. The magnetic drive of claim 8, further comprising a moment arm in rotatable contact with and driven by the drive nut.

10. The magnetic drive of claim 9, further comprising an axle integrally formed with the moment arm.

11. The magnetic drive of claim 1, wherein the axle defines a wing shaft.

12. The magnetic drive of claim 10, further comprising:
    a. a center bearing member integrally formed with the membrane; and
    b. a thrust bearing on either side of the center bearing member.

13. A depth control device comprising:
    a. a motor;
    b. a control surface;
    c. a magnetic coupling drive between the motor and the control surface, the magnetic coupling drive including a membrane separating the magnetic coupling into a drive side and a motor side.

14. The depth control device of claim 13, wherein the magnetic coupling drive comprises:
    a. a motor-side drive block coupled to the motor;
    b. a plurality of magnet pieces in the motor-side drive block;
    c. a drive-side drive block;
    d. a plurality of magnet pieces in the drive-side drive block;
    e. wherein the membrane is disposed between the motor-side drive block and the drive-side drive block; and
    f. a mechanical coupling between the drive-side drive block and the control surface.

15. A method of moving a control surface in a depth control device comprising the steps of:
    a. rotating a drive motor;
    b. rotating a first plurality of magnet pieces as a result of the rotation of the drive motor, thereby generating a rotrating magnetic flux;

c. coupling the magnetic flux generated in step b. through a thin membrane to a second plurality of magnet pieces;

d. rotating a mechanical coupling as a result of the coupling of the magnetic flux; and e. moving the control surface as a result of the rotation of the mechnical coupling.

* * * * *